United States Patent [19]

Siki

[11] 4,148,189
[45] Apr. 10, 1979

[54] EXHAUST GAS PURIFYING SYSTEM FOR ENGINES

[75] Inventor: Kazuhiro Siki, Toyota, Japan

[73] Assignee: Toyota Jidosha Kogyo Kabushiki Kaisha, Toyota, Japan

[21] Appl. No.: 779,149

[22] Filed: Mar. 18, 1977

Related U.S. Application Data

[63] Continuation-in-part of Ser. No. 511,999, Oct. 4, 1974, abandoned.

[51] Int. Cl.² ............................................. F01N 3/10
[52] U.S. Cl. .................................................... 60/290
[58] Field of Search .......................... 60/289, 290, 274

[56] References Cited

U.S. PATENT DOCUMENTS

| | | | |
|---|---|---|---|
| 3,906,723 | 9/1975 | Matumoto | 60/290 |
| 3,955,364 | 5/1976 | Lewis | 60/290 |
| 3,962,868 | 6/1976 | Matumoto | 60/290 |
| 3,992,878 | 11/1976 | Moorman | 60/290 |

*Primary Examiner*—Douglas Hart
*Attorney, Agent, or Firm*—Koda and Androlia

[57] ABSTRACT

An exhaust gas purifying system for automobile engines or like engines of the type injecting a secondary air for burning the unburned part of the exhaust gases produced in an engine and more particularly an improved purifying system of the type whereby the injection is automatically cut off especially when the engine speed is rapidly decelerated, accelerated, or the engine runs under high loads, in which an air injection conduit is closed by the action of a valve which is actuated by detecting a drop or decrease in a suction vacuum in the engine as the engine is increasing its speed or is running under high loads, and is closed by the action of the aforementioned valve which is actuated under the action of a valve which is operable in response to rapid increases the suction vacuum suffers as the engine speed is rapidly diminishing.

6 Claims, 12 Drawing Figures

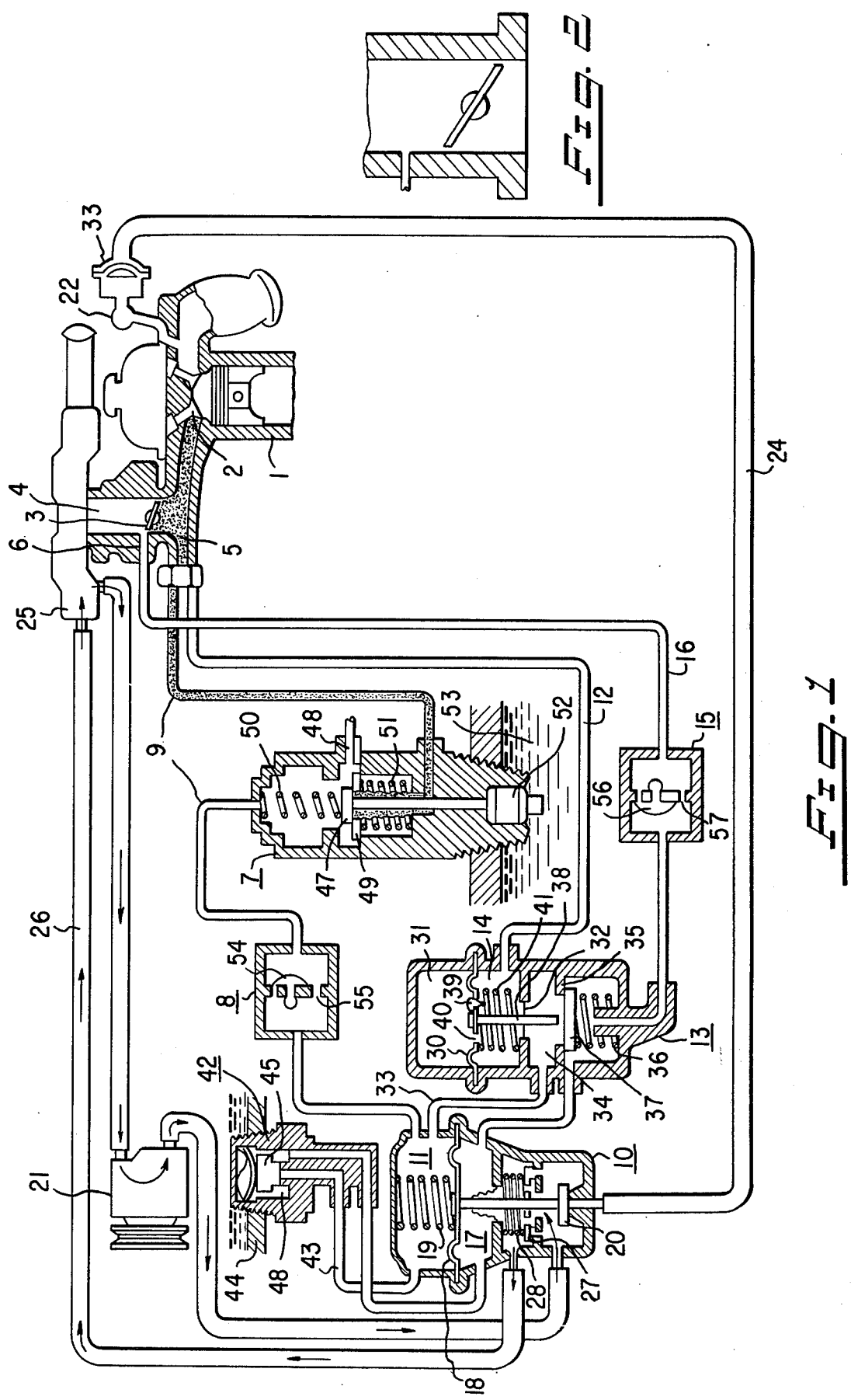

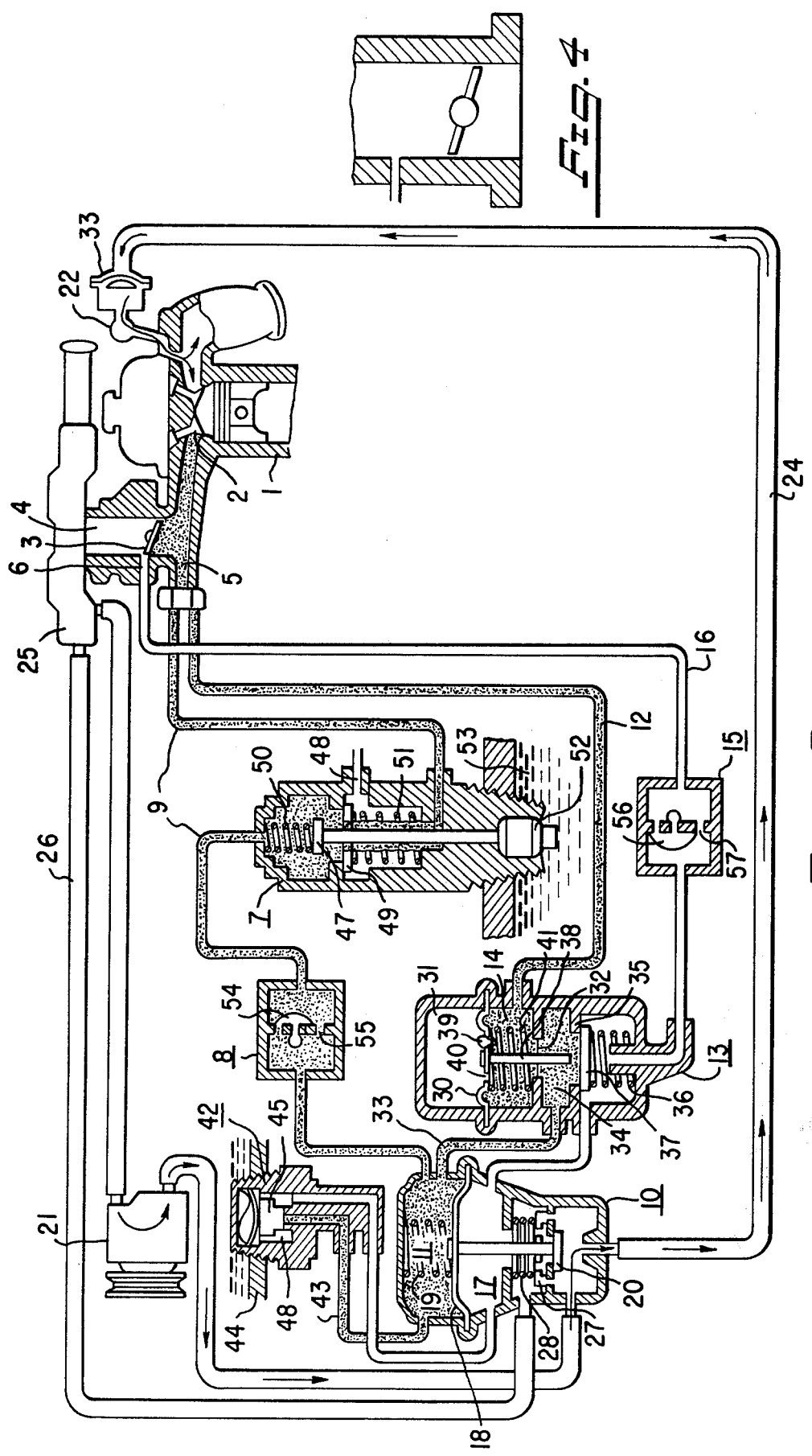

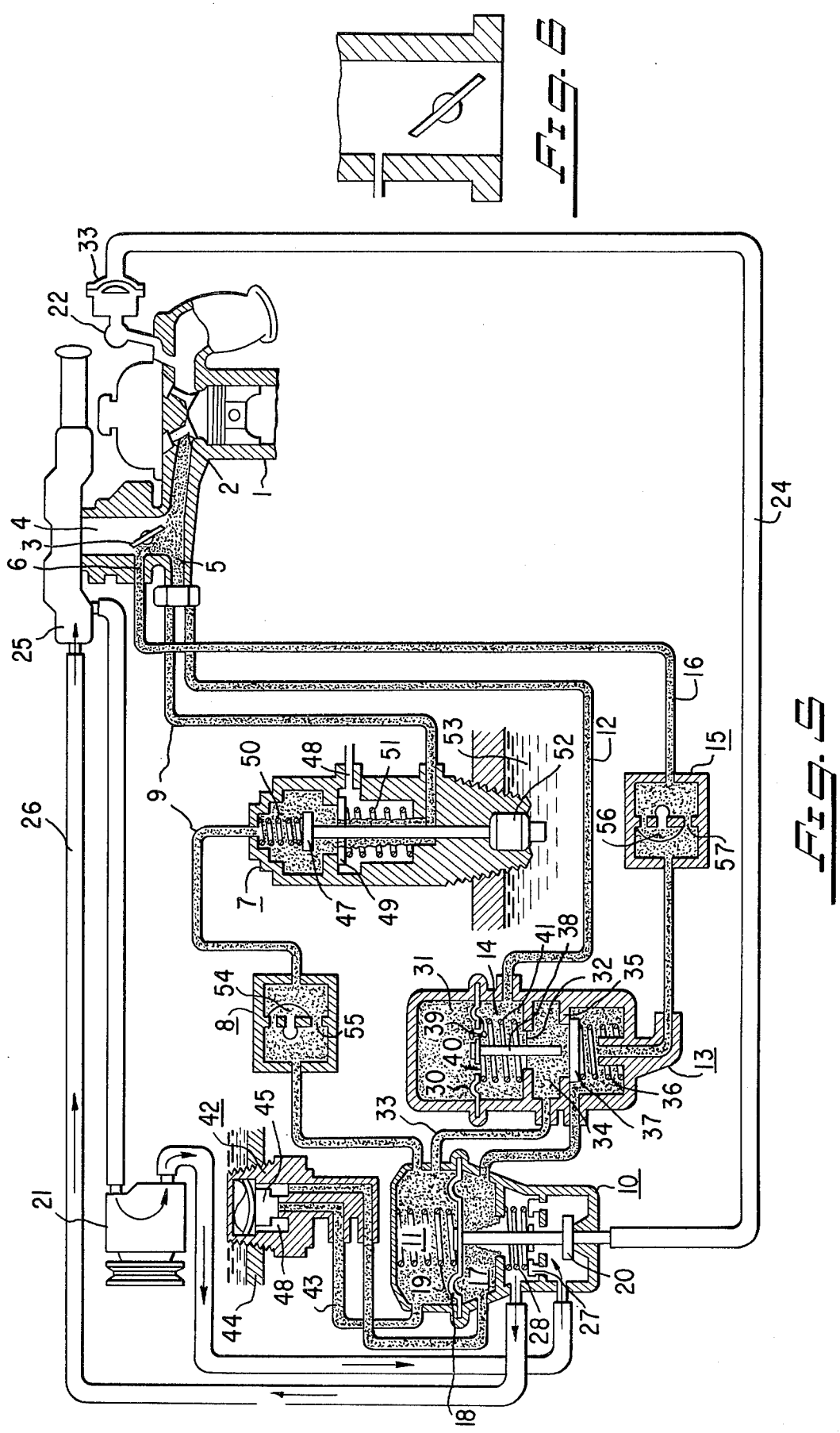

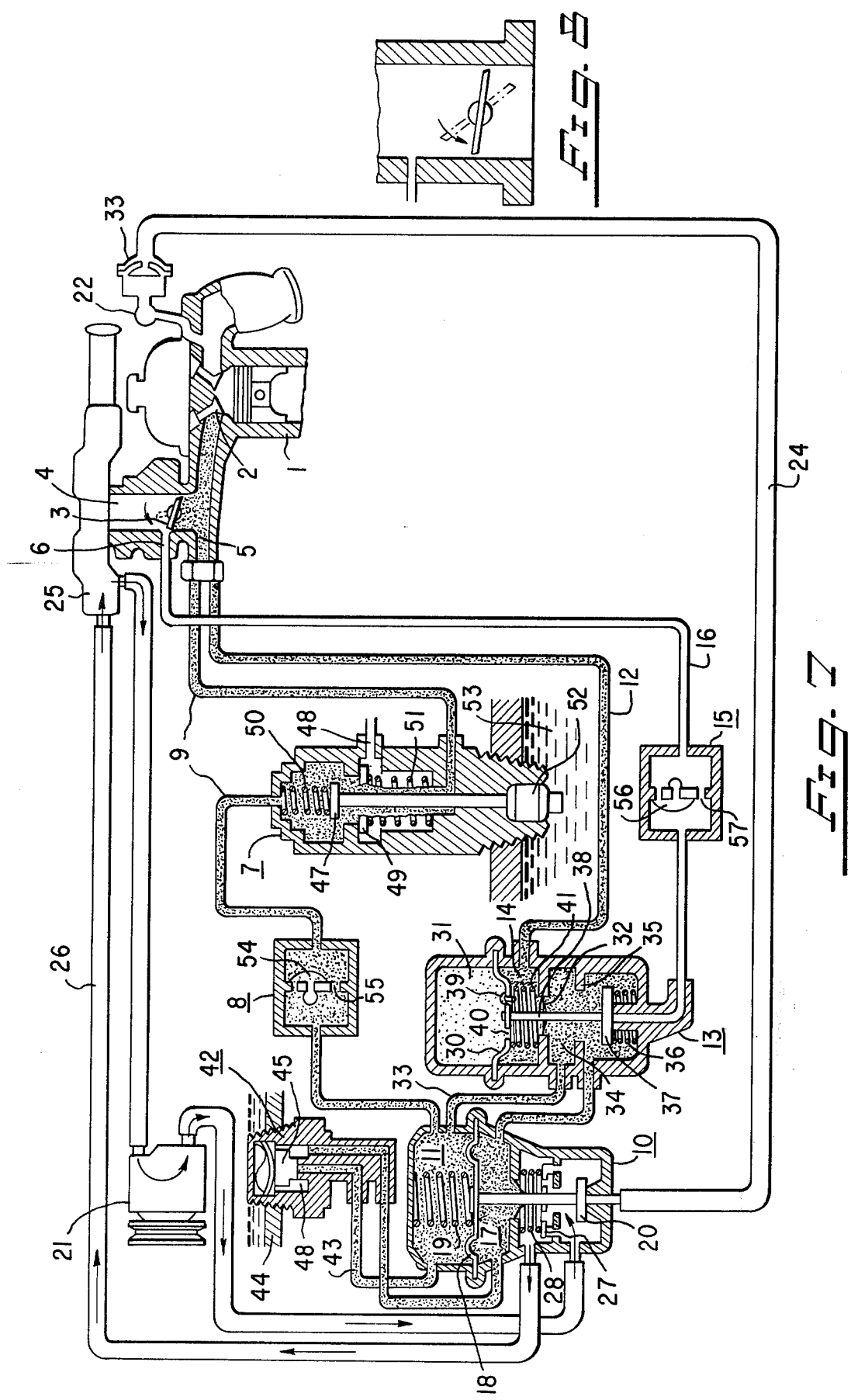

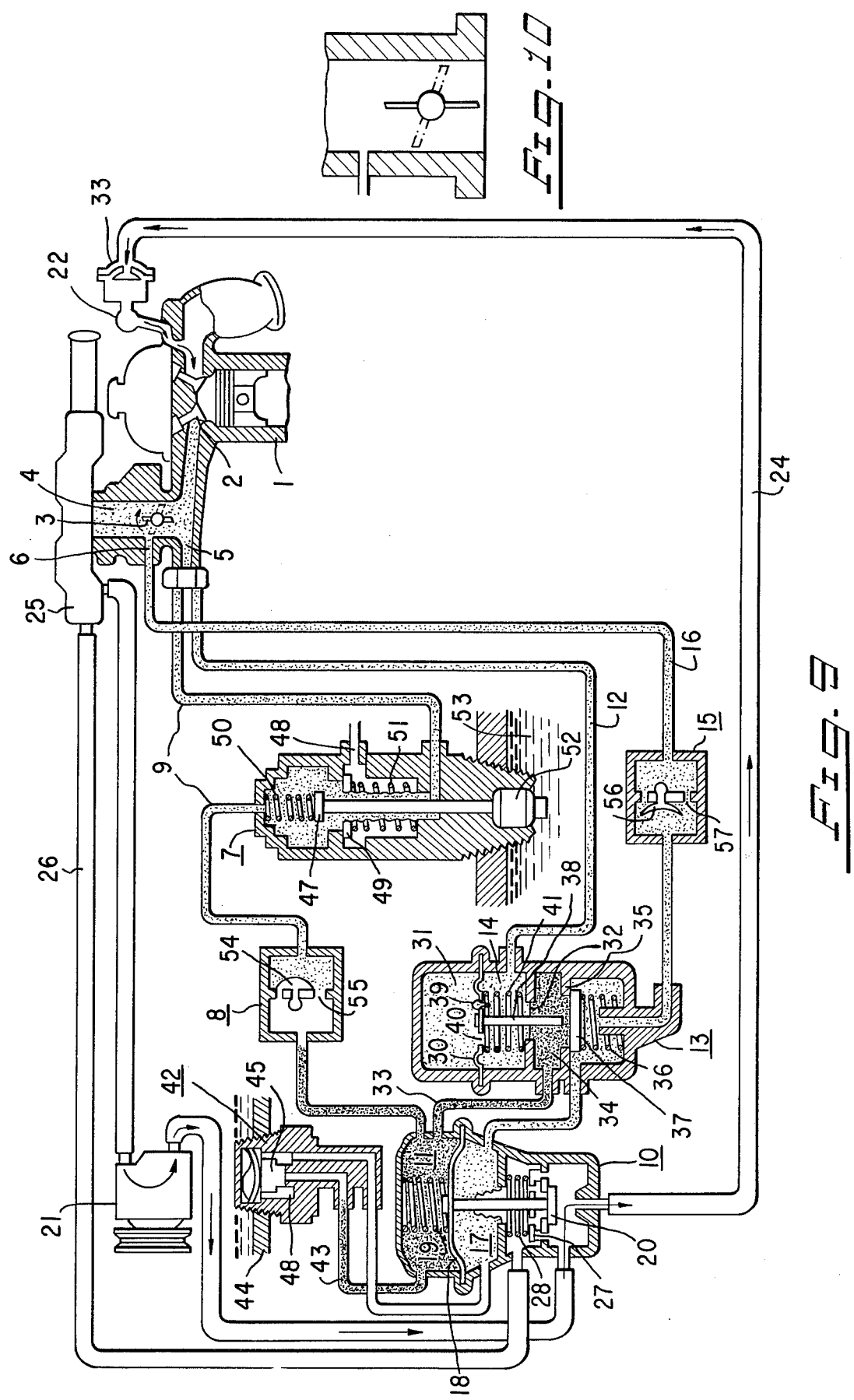

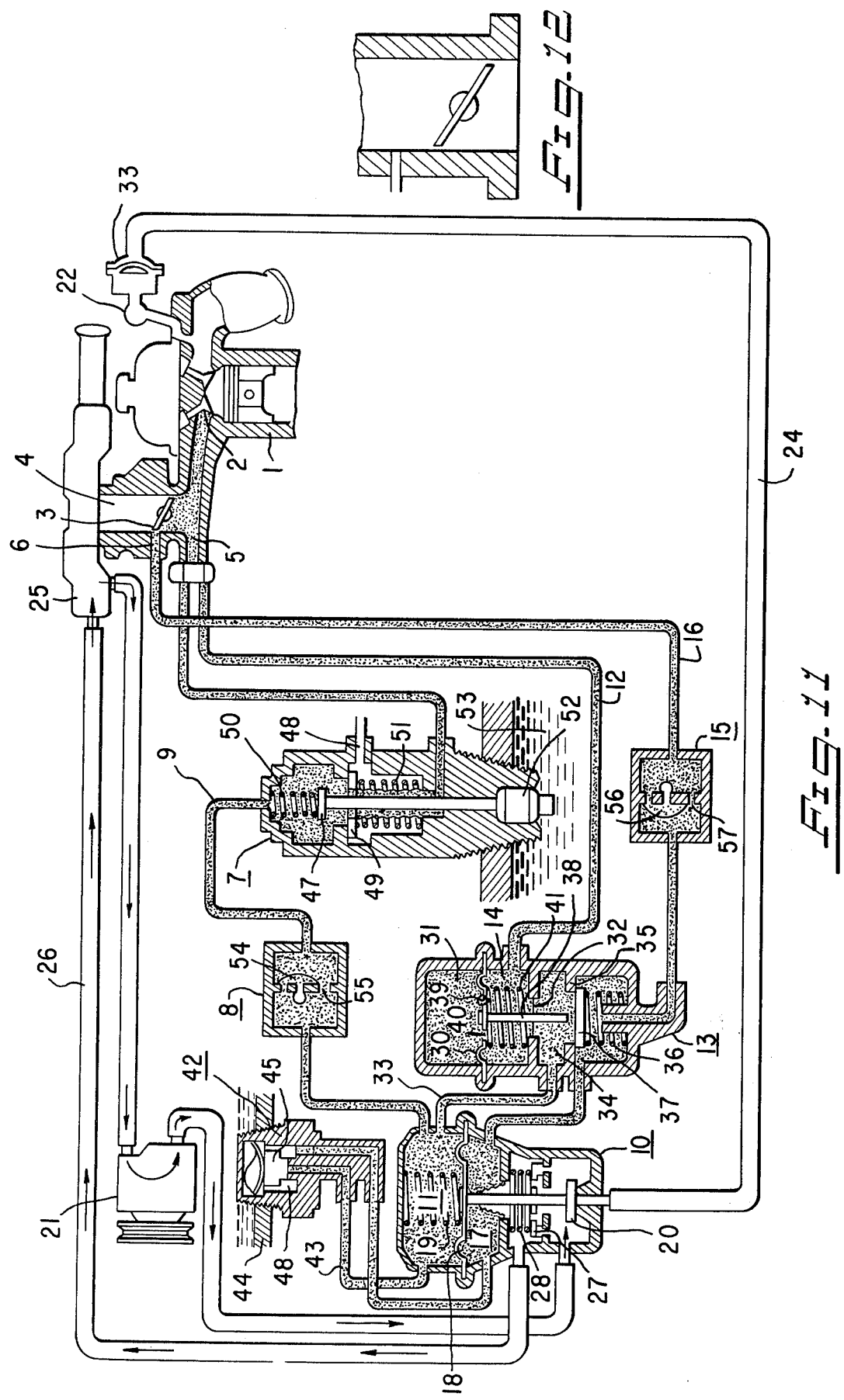

EXHAUST GAS PURIFYING SYSTEM FOR ENGINES

This is a continuation in part of application Ser. No. 511,999, filed Oct. 4, 1974, now abandoned.

BACKGROUND OF THE INVENTION

This invention relates to an exhaust gas purifying system for automobile engines or their likes, and more particularly to an improved purifying system of the type of injecting a secondary air in the vicinity of the exhaust valve for burning the unburned part of the exhaust gases produced in the engine.

According to the conventional exhaust gas purifying system of similar type, there is provided in an air supply conduit an air by-pass valve which is actuated in response to increases in the suction vacuum of an engine as the engine is rapidly decreasing its speed to discharge the air to the atmosphere and temporarily cut off the injection of the air or an anti-afterburn valve which is then actuated temporarily to introduce the air into a suction system of the engine. These valves are intended to prevent any occurrence of after-burning and resultant overheat in an exhaust system due to the effect of reburning large quantities of unburned part of the exhaust gases produced as the engine is rapidly reducing its speed.

Generally, high-temperature gases are exhausted from the engine which is running at high speeds, and contain a small amount of the unburned part therein. Therefore, there is little need of injecting the secondary air for reburning the unburned part. There may also occur overheat in the exhaust system when excess air (secondary air) is fed into the exhaust gases under high speed conditions of the engine for reburning the unburned part.

In order to avoid such occurrence of overheat, therefore, it is also necessary to cut off the injection of the secondary air when the engine is accelerating and is running under high loads.

The valves referred to earlier present disadvantages, however, since they are only actuated when the suction vacuum becomes higher as the speed of the engine is rapidly diminishing, so that it is practically difficult or impossible to cut off the injection of the secondary air under the speed-up and high load conditions of the engine where changes in the suction vacuum are small. Particularly, the air by-pass type valve has a drawback in operation that as the secondary air is discharged to the atmosphere, undesirable noises are very likely to occur.

SUMMARY OF THE INVENTION

It is one object of the present invention to provide an exhaust gas purifying system for automobile engines or likes of the secondary air injection type, thereby preventing overheat in an exhaust system of the engine.

Another object of the present invention is to provide an improved purifying system of the type whereby the injection of the secondary air is automatically cut off to avoid reburning the unburned part of the exhaust gases especially when the engine is rapidly slowing down, is increasing its speed and is running under high loads.

Still another object of the present invention is to provide a purifying system of the type whereby the production and leakage of noises is practically minimized.

A further object of the present invention is to provide a gas purifying system of the type, whereby reburning of the unburned part of the exhaust gases is avoided by suspended the air injection for a certain period of time, when the engine is suddenly decelerated.

Still a further object of the present invention is to provide a gas purifying system of the type, whereby the air injection is suspended for a certain period of time after accelerating operation.

Still a further object of the present invention is to provide a gas purifying system of the type, whereby the air injection is suspended, when the temperature of the engine is low.

Still a further object of the present invention is to provide a gas purifying system of the type, whereby the air injection is suspended, when the temperature of the intake manifold is high.

Still a further object of the present invention is to provide a gas purifying system, whereby the value of the negative pressure as the determining factor for ON-OFF of the secondary air injection is selective.

BRIEF DESCRIPTION OF THE DRAWINGS

FIGS. 1, 3, 5, 7, 9, 11 are a systamatic diagram of the exhaust gas purifying system of various embodiments of this invention.

FIGS. 2, 4, 6, 8, 10 and 12 are an enlarged sectional view of the vacuum control valve included in the purifying system shown in FIGS. 1, 3, 5, 7, 9 and 11 respectfully.

DESCRIPTION OF THE PREFERRED EMBODIMENT

This invention will be best understood by referring to the accompanied drawings.

Referring first to FIG. 1, there are provided in the upper stream of an intake value installed in cylinder of the engine a first negative pressure port 5 and a second negative pressure port 6 open to inside of an intake pipe 4 near a throttle valve 3.

Said first negative pressure port 5 must be placed in the downstream of the throttle valve 3 and said secondary negative pressure port 6 is so arranged that it is in the upperstream of the throttle valve 3 when the valve 3 is less open than a certain point and it is in the downstream of the valve 3 when the valve 3 is open more than the point.

Said negative pressure port 5 is coupled to a first negative pressure chamber 11 of an air-switching valve 10 (hereinaftr referred to as ASV) through a first negative pressure pipe 9 having therein a thermostatic vacuum switching valve 7 (hereinafter referred to as TVSV) and a vacuum transmitting valve (hereinafter referred to as VTV). The first negative pressure port 5 is coupled to a second negative pressure chamber 14 of a vacuum control valve 13 (hereinafter referred to as VCV) through a negative pressure pipe 12.

Said second pressure port 6 is coupled to a second negative pressure chamber 17 of ASV10 through a second negative pressure pipe 16 having therein VTV15 and VCV13.

The ASV10 is provided with a first and a second negative pressure chamber 11 and 17, a diaphragm 18 therebetween, a spring 19 pressing the diaphragm 18 toward the second negative pressure chamber 17, and a valve 20 coupled to the diaphragm 18. The ASV10 is also provided with a secondary air supply pipe 24 in the mid-way thereof, said pipe 24 supplying compressed air exhaled from an air-pump 21 to an air injection manifold 22 through a check valve 23. The ASV10 has a by-pass pipe 26 coupled thereto, said pipe 26 being connected to an air cleaner 25 the valve 20 of said ASV is so designed that it will close the by-pass pipe 26 and open the secondary air supply pipe 24 when the diaphragm 18 is in a higher position, and it will close the secondary air supply pipe 24 at its mid-way thereby causing the compressed air from the air pump 21 to go through the by-pass pipe 26.

Reference numeral 27 in FIG. 1 represents a relief valve of ASV10, said valve 27 being designed whereby it will be open against a spring 28 when the pressure of the compressed air from the air pump 21 is too much. The relationship of the area of the diaphragm 18 to receive the pressure with the spring 19 is arranged such that the diaphragm will shift upward against the spring 19 only when the pressure of the first negative pressure chamber 11 is lower than that of the second negative pressure chamber 17 by more than a certain degree.

VCV13 comprises the second negative pressure chamber 14, a diaphragm 30, a first negative pressure chamber 31 confronted with the second negative pressure chamber 14 through the diaphragm 30, a mid chamber 34 installed in contact with the second negative pressure chamber 14 at its bottom through a seal 32 and connected to the first negative pressure chamber 11 of ASV10 through the negative pressure pipe 33, a valve supporter 35 between the mid chamber and the second negative pressure pipe 33, a valve 37 spring-loaded by a spring 36 against the valve supporter 35. A rod 38 fixed to the diaphragm 30 and extending into the mid chamber 34 through the second negative pressure chamber 14 and the seal 32, a one-way valve 39 provided upon the diaphragm 30 to allow air-flow from the second negative pressure chamber 14 to the first negative pressure chamber 31, an orifice 40 provided in the diaphragm 30, and a spring 41 pressing the diaphragm 30 toward the first negative pressure chamber 31. The relativity among the strength of the spring 41, the area of the diaphragm to receive pressure, and the size of the one-way valve 39 and the orifice 40 is so arranged that the diaphragm 30 will shift downward against the spring 41 when the pressure in the second negative pressure chamber 14 is lower than that of the first negative pressure chamber 31 by more than a certain degree and the pressure of said two chambers 14 and 31 will get balanced with the orifice 40 in a certain period of time. The length of the rod 38 is determined such that it will push the valve 37 downward to open the same and close the second negative pressure pipe 16 thereby connecting the two negative pressure chambers of ASV10 each other when the diaphragm 30 is shifted downward.

The two negative pressure chambers 11 and 17 of ASV10 are connected to each other by a coupling pipe 43 which is to be opened and closed by means of a bimetal vacuum switching valve 42 (hereinafter referred to as BVSV). BVSV42 is installed below an intake manifold 44, and is so designed that it will be opened through a valve 45 spring loaded by a spring 46 when the temperature in the intake manifold 44 is beyond 203° F. (approximately 95° C.) and the bimetal turns to the opposite direction.

TVSV7 comprises a valve 47 to open and close the first negative pressure pipe 9, a second valve 49 to substantially open and close a port 48 open to the atmosphere, a spring 50 to press and close the valve 47, a second spring 51 to press and close the second valve 49, and a thermo-wax 52 connected to the valve 47. The valve 47 is so designed that it will close the pipe 9 and push the second valve 49 downward to open, thereby introducing air through the port 48 into the first negative pressure chamber 11 when the temperature of engine cooling water 53 is 55° F. (approximately 13° C.) or lower; and it will open the pipe 9 against the spring 50 and the second valve 49 will close the port 48, thereby introducing the negative pressure of the intake pipe into the negative pressure chamber 11.

VTV8 is provided with a one-way valve 54 and an orifice 55, said valve 54 allowing only the air-flow from ASV10 to the negative pressure port 5. VTV15 is provided with a one-way valve 56 and an orifice 57, said valve 56 allowing only the air-flow from the negative pressure port 6 to ASV10.

Hereinbelow there is given an explanation about an embodiment of the system of this invention.

As shown in FIG. 1 and 2 when the temperature of the engine cooling water is 55° F. lower, only the air from the atmosphere is introduced into the first negative pressure chamber 11 of ASV10, since TVSV7 closes the negative pressure pipe 9. As a result, the valve 20 of ASV10 is so located that it closes the secondary air supply pipe 24, since the diaphragm is shifted downward. Therefore, the compressed air from the air pump 21 will go through the by-pass, and there will be no secondary air injection from the air injection manifold 22.

Now referring to FIG. 3, when the temperature of the engine cooling water is more than 55° F. TVSV7 is open, and the port 48 is closed by the second valve 49, the intake negative pressure from the first negative pressure port 5 is transmitted to the first negative pressure chamber 11 of ASV10 through TVSV7 and VTV8. Under this condition, when the engine speed is low, the second negative pressure port 6 receives no negative pressure; therefore, the pressure near the atmospheric pressure is transmitted to the second negative pressure chamber 17 of ASV10 coupled to the port 6 through the second negative pressure chamber 17. As a result, the diaphragm 18 of ASV10 is pushed upward against the spring 19, thereby causing the valve 20 to open the secondary air supply pipe 24 and resulting in that the compressed air from the air pump 21 is injected through the air injection manifold.

Referring to FIG. 5, when TVSV7 is open and the engine speed is high, both the negative pressure port 5 and 6 will receive the intake negative pressure. Therefore, the two negative pressure chambers 11 and 17 of ASV10 will have substantially the same pressure, whereby the diaphragm 18 is pushed downward by the spring 19 to cause the secondary air supply pipe 24 to be closed by valve 20, thereby the compressed air from the air pump 21 moving back to the air cleaner 25 through the by-pass. 26. As a result, there will be no air injection, when the engine temperature is not low and the engine speed is high.

Referring to FIG. 7, when TVSV 7 is open and when the engine is decelerated suddenly from the medium-high speed, the negative pressure for the first negative pressure port 5 will increase suddenly and the negative pressure for the second negative pressure port will decrease suddenly. Therefore, the pressure in the second negative pressure chamber 14 of VCV13 coupled to the first negative pressure port 5 through the negative pressure pipe 12 will decrease suddenly, and the diaphragm 30 will be drawn in downward suddenly against the spring 36. As a result, the valve 37 will close the second negative pressure pipe 16 and connect the two negative pressure chambers 11 and 17 of ASV10 each other through the negative pressure pipe.

Thus, the diaphragm 18 is pushed downward by the spring 19 and the valve 20 closes the secondary air supply pipe 24 to suspend the air injection.

Since the two negative pressure chambers 14 and 31 of VCV13 are connected to each other through the orifice 40, the pressure of said chambers will become the same after a certain period of time, thereby causig the diaphragm 30 to return to the original position, when the diaphragm 30 is drawn in downward. When the diaphragm 30 is returned to the original position, the valve 37 opens the second negative pressure pipe 16 and close the valve supporter 35. Thus, the pressure near the atmospheric pressure is transmitted to the second negative pressure chamber 17 of ASV10, whereby the valve 20 opens the secondary air supply pipe 24 to start the air injection again. In other words, when decelerating suddenly, the air injection will be suspended for a certain period of time after such decelerating operation.

Referring to FIG. 9, when TVSV7 is open, and the throttle valve 3 is widely open; i.e., when accelerating or having a very high load, the two negative pressure ports 5 and 6 receive pressure near the atmospheric pressure and the negative pressure chambers of ASV10 connected to said ports 5 and 6 will have decreasing negative pressure. Under such a condition, VTV15 will rapidly transmit the decreasing negative pressure for the negative pressure port 6 to the second negative pressure chamber 17 of ASV10. However, the decreasing negative pressure will be transmitted to the first negative pressure chamber 11 of ASV10 with some delay, since VTV8 is operating against VTV15. Therefore, the diaphragm 18 will be drawn in upward as shown in FIG. 9, until the negative pressure in the first negative pressure chamber 11 becomes low, thereby the secondary air injection not being suspended. After a certain period of time, when the negative pressure in the negative pressure chamber 11 is decreased, the diaphragm is pressed downward by the spring 19, thereby causing the secondary air injection suspended. Therefore, when accelerating (for example, pushing down the accelerator pedal hard), the secondary air injection is maintained for a certain period of time and the unburned part of the exhaust gases created in the accelerating process will be burned.

Referring to FIG. 11, when the temperature of the intake manifold is more than 203° F., the bimetal of BVSV42 will turn to the opposite direction, thereby causing the spring 46 to open the valve 45. As a result, the negative pressure in the negative pressure chambers of ASV10 will become the same and the diaphragm 18 is pushed downward to close the secondary air injection pipe 24, thereby suspending the secondary air injection.

I claim:

1. An exhaut gas purifying system of the type of injecting a secondary air pumped by an air pump and through a secondary air supply pipe and injected from a secondary air injection port provided in the vicinity of the exhaust valve of an engine for reburning the unburned part of the exhaust gases produced in the engine, wherein said system comprises, a diaphragm provided adjacent said secondary air supply pipe;
a first and a second negative pressure chambers forming a pair to sandwich said diaphragm;
an air switching valve attached to said diaphragm to open said secondary air supply pipe and forward the secondary air to said secondary air injection port only when the pressure of said first chamber is lower than that of said second chamber by more than a certain degree;
a negative pressure port provided in an intake passage downstream of a throttle valve;
a first negative pressure intake pipe for connecting said negative pressure intake port with said first negative pressure chamber of said air switching valve;
an air injection cut port provided in said intake passage in such a point thereof as located above said throttle valve when engine speed is low and to be located below said throttle valve when said throttle valve is open, and
a vacuum control valve provided in a second negative pressure pipe to connect said air injection cut port with said second negative pressure chamber of said air switching valve, said vacuum control valve being actuated by intake negative pressure downstream of said throttle valve, normally closing said second negative pressure pipe and alternately connecting said first and second negative pressure chambers of said air switching valve to each other for a certain period of time after the intake negative pressure is suddenly increased at more than a certain rate.

2. An exhaust gas purifying system according to claim 1, wherein a vacuum transmitting valve is provided in said first negative pressure chamber, said valve being to delay air flow from the intake passage to the first negative pressure chamber.

3. An exhaust gas purifying system according to claim 1, wherein a vacuum transmitting valve is provided in said second negative pressure pipe, said valve being to delay air flow from the second negative pressure chamber to the intake passage.

4. An exhaust gas purifying system according to claim, wherein a thermostatic vacuum switching valve is provided in the first negative pressure pipe, said valve being to close said negative pressure pipe, when the coolant temperature is low.

5. An exhaust gas purifying system according to claim 1, wherein the first and second negative pressure chambers of said air switching valve are connected to each other by a negative pressure pipe having a bimetal vacuum switching valve, said bimetal vacuum switching valve is located under an intake manifold so that saaid valve will open the negative pressure pipe when the temperature of the intake manifold is high.

6. An exhaust gas purifying system according to claim 1, wherein said air switching valve is arranged such that said valve transmits the air from said air pump to an air cleaner through a by-pass pipe when the secondary air supply pipe is closed.

* * * * *